US010095765B1

(12) United States Patent
Ma et al.

(10) Patent No.: US 10,095,765 B1
(45) Date of Patent: Oct. 9, 2018

(54) METHOD AND APPARATUS FOR A HARDWARE-IMPLEMENTED AVL TREE MODULE

(71) Applicant: Marvell International Ltd., Hamilton (BM)

(72) Inventors: Tianan Tim Ma, Palo Alto, CA (US); Timothy J. Donovan, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 778 days.

(21) Appl. No.: 14/245,266

(22) Filed: Apr. 4, 2014

Related U.S. Application Data

(60) Provisional application No. 61/810,609, filed on Apr. 10, 2013.

(51) Int. Cl.
*G06F 17/30* (2006.01)
(52) U.S. Cl.
CPC .............................. *G06F 17/30587* (2013.01)
(58) Field of Classification Search
CPC ................................................ G06F 17/30587
USPC ......................................................... 707/797
See application file for complete search history.

(56) References Cited

U.S. PATENT DOCUMENTS

| | | | | |
|---|---|---|---|---|
| 3,990,055 A * | 11/1976 | Henderson | .............. | G06F 13/36 710/40 |
| 7,185,321 B1 * | 2/2007 | Roe | ..................... | G06F 11/3664 712/227 |
| 8,539,494 B2 * | 9/2013 | Saxe | ..................... | G06F 9/5027 718/103 |
| 8,880,802 B1 * | 11/2014 | Krishnamurthy | ....... | G06F 12/00 711/114 |
| 9,063,840 B1 * | 6/2015 | Deshpande | .......... | G06F 12/0207 |
| 9,170,843 B2 * | 10/2015 | Glew | .................... | G06F 9/5011 |
| 2003/0083049 A1 * | 5/2003 | Matthews | ........... | H03M 7/3088 455/414.1 |
| 2004/0117768 A1 * | 6/2004 | Chang | ................. | G06F 11/3664 717/125 |
| 2006/0072461 A1 * | 4/2006 | Luong | ..................... | H04L 45/02 370/236 |
| 2006/0184768 A1 * | 8/2006 | Bishop | ................ | G06F 9/30149 712/215 |
| 2007/0124568 A1 * | 5/2007 | Kra | ......................... | G06F 9/462 712/226 |

(Continued)

*Primary Examiner* — Mark E Hershley

(57) ABSTRACT

The present disclosure describes techniques and apparatuses for a hardware-implemented Adelson-Velskii and Landis' (AVL) tree module. In some aspects, commands are received at the AVL tree module that request operations be performed for an AVL tree table stored in memory. Each command is written to one of multiple hardware threads of the AVL tree module that perform AVL tree operations by causing records of the AVL tree table to be read from memory using a single read operation and then written to the AVL tree module, modifying those records without accessing memory, and causing modified records to be written back to memory using a single write operation. Once a command is written to a hardware thread, the hardware thread can perform the corresponding AVL tree operation. After the AVL tree operation is performed, results are returned to the requesting agent to indicate whether the AVL tree operation was performed successfully.

20 Claims, 7 Drawing Sheets

(56) References Cited

U.S. PATENT DOCUMENTS

| | | | | |
|---|---|---|---|---|
| 2007/0130387 A1* | 6/2007 | Moore | ............... | G06F 13/20 |
| | | | | 710/40 |
| 2007/0150657 A1* | 6/2007 | Yigzaw | ............... | G06F 12/0842 |
| | | | | 711/128 |
| 2008/0295105 A1* | 11/2008 | Ozer | ............... | G06F 9/3851 |
| | | | | 718/103 |
| 2010/0268743 A1* | 10/2010 | Hallyal | ............ | G06F 17/30961 |
| | | | | 707/797 |
| 2012/0324147 A1* | 12/2012 | Lai | ............... | G06F 13/4291 |
| | | | | 711/103 |
| 2013/0166886 A1* | 6/2013 | Sasanka | ............. | G06F 9/30098 |
| | | | | 712/216 |
| 2014/0164732 A1* | 6/2014 | Muff | ............... | G06F 12/1027 |
| | | | | 711/207 |

* cited by examiner

300

302

| Data Value | Balance Factor | Pointer to Left Subtree | Pointer to Right Subtree |
|---|---|---|---|
| Data 5 | 2 | Ptr to 3 | Ptr to D |
| Data 3 | -1 | Ptr to A | Ptr to 4 |
| Data A | N/A | NULL | NULL |
| Data 4 | 0 | Ptr to B | Ptr to C |
| Data B | N/A | NULL | NULL |
| Data C | N/A | NULL | NULL |
| Data D | N/A | NULL | NULL |

304

| Data Value | Balance Factor | Pointer to Left Subtree | Pointer to Right Subtree |
|---|---|---|---|
| Data 4 | 0 | Ptr to 3 | Ptr to 5 |
| Data 3 | 0 | Ptr to A | Ptr to B |
| Data A | N/A | NULL | NULL |
| Data B | N/A | NULL | NULL |
| Data 5 | 0 | Ptr to C | Ptr to D |
| Data C | N/A | NULL | NULL |
| Data D | N/A | NULL | NULL |

Fig. 3

METHOD AND APPARATUS FOR A HARDWARE-IMPLEMENTED AVL TREE MODULE

CROSS REFERENCE TO RELATED APPLICATION(S)

This present disclosure claims priority under 35 U.S.C. § 119(e) to U.S. Provisional Patent Application Ser. No. 61/810,609 filed Apr. 10, 2013, the disclosure of which is incorporated herein by reference in its entirety.

BACKGROUND

Many electronic systems involve the maintenance and storage of vast amounts of information. If the information is not organized for optimum search performance, searching the information to find a particular piece or pieces of information can be unacceptably time consuming. In addition to resulting in sometimes unacceptably long search times, some approaches to organizing information result in unpredictable search times. Thus, when an organizational approach results in unpredictable search times, some pieces of information may be found in a relatively short amount of time, while finding other pieces takes a relatively long amount of time.

To improve search performance, both in terms of search time and predictability, several organizational approaches have been developed. The Adelson-Velskii and Landis' (AVL) tree, for instance, is an approach that results in better search performance for large amounts of information—e.g., in terms of both search time and predictability, than other approaches to organizing information, such as hash tables. Although search performance for information organized using an AVL tree may be better than for information organized using other approaches, conventional techniques to maintain the information as an AVL tree can consume significant computing resources. Consequently, AVL trees may not be used to organize some information even though they could result in better search performance than other organizational approaches.

SUMMARY

This summary is provided to introduce subject matter that is further described below in the Detailed Description and Drawings. Accordingly, this summary should not be considered to describe essential features nor used to limit the scope of the claimed subject matter.

In general, in one aspect, this specification describes a method for receiving, at an Adelson-Velskii and Landis' (AVL) tree module, commands that request the AVL tree module perform operations for an AVL tree table stored in memory. Each command is written to one of multiple hardware threads of the AVL tree module. The hardware threads can perform AVL tree operations by causing records stored as part of the AVL tree table to be read from memory using a single read operation and then written to the AVL tree module, modifying those records without accessing memory, and causing modified records to be written back to memory using a single write operation. Once a command is written to a hardware thread, the hardware thread is employed to perform the corresponding AVL tree operation. After the AVL tree operation is performed, results are returned to the requesting agent to indicate whether the AVL tree operation was performed successfully.

In general, in another aspect, this specification describes a device that includes a memory configured to store an Adelson-Velskii and Landis' (AVL) tree table that is representative of an AVL tree. The device also includes an AVL tree module that is implemented in hardware. The AVL tree module can receive commands from agents requesting that the AVL tree module perform AVL tree operations for the AVL tree table. The AVL tree module includes multiple hardware threads that it can use to perform the AVL tree operations. The AVL tree module can write each of the commands received to one of the hardware threads to have the command performed by the hardware thread to which it is written. After the AVL tree operations are performed, the hardware threads can output results that indicate to an agent whether the AVL tree operations were performed successfully.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

FIG. 3 illustrates an example of data records of hardware-implemented AVL tree module techniques that can be updated with a single read from and write to memory in accordance with one or more aspects.

DETAILED DESCRIPTION

Figure 1:
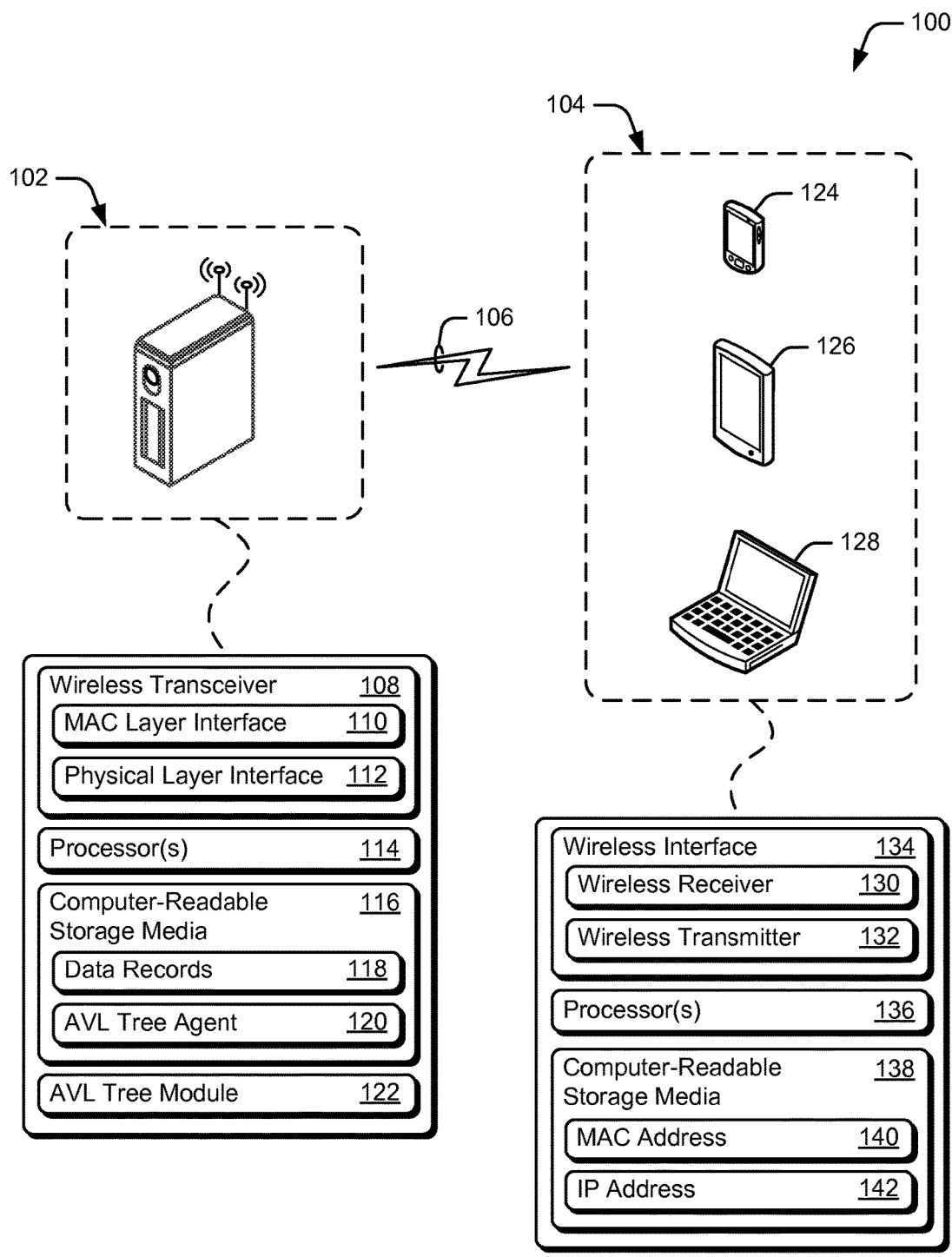
FIG. 1 illustrates an operating environment having an access point to a wireless network and wireless devices capable of communicating with the access point in accordance with one or more aspects.

An Adelson-Velskii and Landis' (AVL) tree is an approach used to organize data. Information maintained according an AVL tree can result in faster and more predictable search performance than other approaches. Conventional techniques for maintaining information as an AVL tree consume significant computing resources—e.g., central processing unit (CPU) time. Many such techniques to maintain information as an AVL tree are based in software. These techniques can involve a substantial number of sequential memory accesses, the result of which is to slow down the processing speed. In many applications, however, CPU cycles are precious. Thus, using CPU cycles to perform maintenance operations on an AVL tree may be impracticable for such applications. The disclosure describes apparatuses and techniques that maintain information according to an AVL tree in a manner that reduces the burden on a CPU. In particular, this disclosure describes offloading AVL tree operations to dedicated hardware. The apparatuses and techniques described herein utilize the capability of that hardware to process the AVL tree operations in parallel, and enhance the speed of those operations as a result.

Records that are stored in a memory may each represent a node of an AVL tree. At least some of these records may be accessed as part of a search that is performed to update the AVL tree—e.g., to insert additional nodes into the tree or remove an already-existing node from the tree. During the search, the records that are accessed are read from the memory. The records that are read from the memory can then be written to an AVL tree module that is implemented in hardware. To do so, an AVL tree agent can cause the records that are read from the memory to be written to the AVL tree module using a single write operation. Alternately, the AVL tree agent can cause the records that are read from the memory to be written to the AVL tree module using a multi-cycle write operation. Once the records are written to the AVL tree module, it can modify those records without subsequently accessing memory. For example, the AVL tree module can modify the records written thereto and that correspond to the nodes of the AVL tree that are affected by the update of the AVL tree. After the AVL tree module modifies the records that correspond to the nodes affected by the update, the modified records can be written back to the memory, updating the AVL tree as a result. To do so, the AVL tree agent can cause the modified records to be written back to memory using a single write operation. Alternately, the AVL tree agent can cause the modified records to be written back to memory using a multi-cycle write operation.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

FIG. 1 illustrates an example operating environment 100 having a wireless access point 102 (access point 102) and wireless devices 104, each of which are wireless-network-enabled and capable of communicating data, packets, and/or frames over communication link 106. Communication link 106 may be any suitable type of wireless communication link. For example, communication link 106 may be implemented in whole or part as a wireless local-area-network (WLAN), ad-hoc WLAN, infrastructure WLAN, wireless mesh network, wireless personal-area-network (WPAN), wireless wide-area-network (WWAN), or short-range wireless network. Communication link 106 may also implement various peer-to-peer communication protocols such as wireless fidelity (WiFi) direct link or a peer-link.

Access point 102 enables wireless devices 104 to communicate over a wireless network connection by, in part, identifying the wireless devices 104. To do so, the access point 102 can extract, from packets sent by the wireless devices 104, identification information that identifies a particular wireless device that sent the information. Using this information, the access point 102 can search for a record associated with the particular wireless device and that enables the access point 102 to communicate with the particular wireless device. Various configurations of access point 102 are contemplated such as a wireless router, a combined wireless router and modem, a desktop computer, server, laptop computer, personal computer (PC), mobile-internet device (MID), gaming console, internet-enabled televisions, "smart" appliances, and so on.

Access point 102 includes a wireless transceiver 108 that provides a wireless interface to handle various communication protocols, such as IEEE 802.11, Bluetooth™, and others mentioned above and elsewhere herein. Wireless transceiver 108 may be configured to implement any suitable type of wireless interface, such as a WLAN, cellular, or Bluetooth™ interface, or a combination thereof. Alternately or additionally, wireless transceiver 108 may be further configured to operate in one or more communication modes, such as infrastructure, peer-to-peer, mesh, peer-link, and the like.

Although shown as a single transceiver, wireless transceiver 108 may be implemented as a separate transmitter and receiver (not shown), and may be hardware combined with or separate from firmware or software. Wireless transceiver 108 communicates data via a media access control (MAC) layer interface 110 and a physical (PHY) layer interface 112, either of which may be hardware combined with or separate from firmware or software. Data of access point 102 is packetized, framed, and/or addressed for communication via MAC layer interface 110. The packetized or framed data is then transmitted over a wireless medium by PHY layer interface 112.

Access point 102 is shown including processor(s) 114 and computer-readable storage media 116 (CRM 116). Processor 114 may be a single core or multiple core processor composed of a variety of materials, such as silicon, polysilicon, high-K dielectric, copper, and so on. CRM 116 may include any suitable memory or storage device, such as random-access memory (RAM), static RAM (SRAM), dynamic RAM (DRAM), non-volatile RAM (NVRAM), read-only memory (ROM), or Flash memory useful to store device data (e.g., data records 118 associated with wireless devices 104). The data records 118 can be associated with a respective wireless device 104 and enable the access point 102 to communicate with the respective wireless device 104. Further, data records 118 can be maintained as an AVL tree. In this way, the access point 102 can search for a data record 118 that is associated with a particular wireless device 104 using an AVL tree search.

References are made herein to AVL tree updates, AVL tree rebalancing, AVL tree search, and maintaining information as an AVL tree (structure). Although AVL trees are well-known to those skilled in the art, a brief overview of AVL trees is included herein to assist the reader. An Adelson-Velskii and Landis' (AVL) tree, named after the inventors, is a self-balancing binary search tree. In an AVL tree, the heights of two child subtrees of any node differ by at most one level. If the difference in height between the two child subtrees of a node differs by more than one level—e.g., as a result of node insertion or deletion, the tree is rebalanced to restore that property. By maintaining this balance, searching for a particular node, inserting a node, and deleting a node each take O(log n) time in both the average and worst cases, where n is the number of nodes in the tree prior to the operation.

Figure 2:
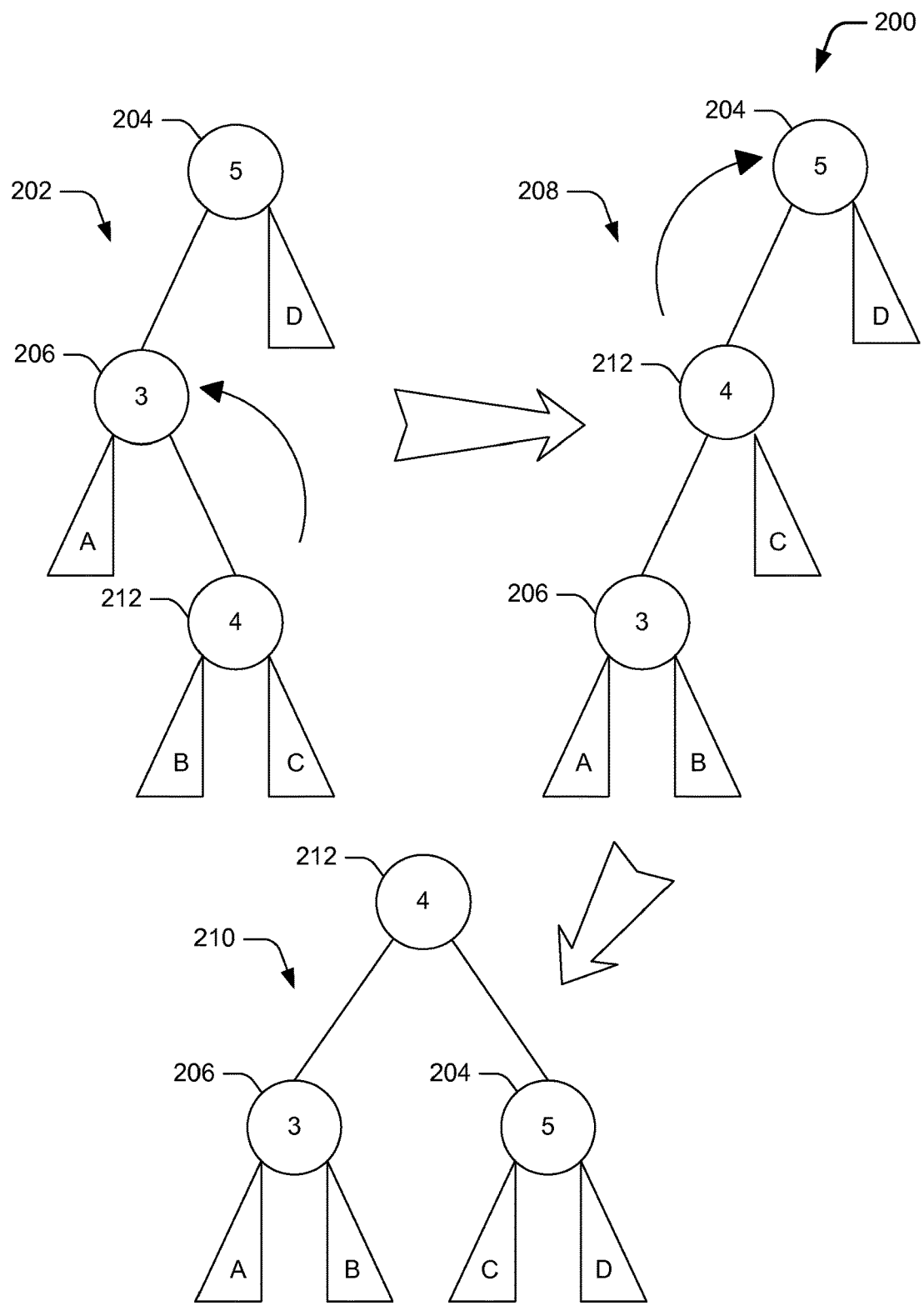
FIG. 2 illustrates an example AVL tree that can be rebalanced using an AVL tree module in accordance with one or more aspects.

FIG. 2 illustrates an example AVL tree that can be rebalanced using an AVL tree module in accordance with one or more aspects at 200. When nodes are inserted into or deleted from an AVL tree, one or more tree rotations may be performed to rebalance the tree.

When a node is inserted into an AVL tree, for instance, each ancestor of the inserted node is checked for consistency with the "rules" of AVL trees—e.g., that the heights of two child subtrees of any node differ by at most one level. To ensure compliance with these rules, a balance factor is calculated for each node that is checked. If the balance factor calculated for a node is equal to negative one (−1), zero (0), or positive one (1), then no rotations are initiated based on that node. If the balance factor calculated for a node is less than negative one (−1) or greater than positive one (+1), however, the subtree rooted at that node is considered to be unbalanced. In accordance with AVL tree techniques, the balance factor for a node i is calculated as follows:

BalanceFactor(i)=height(left subtree(i))−height(right subtree(i))

Alternately, the balance factor for a node i can be calculated as follows:

BalanceFactor(i)=height(right subtree(i))−height(left subtree(i))

Still further, the balance factor for a node i can be calculated as follows:

BalanceFactor(i)=|height(left subtree(i))−height(right subtree(i))|

When the balance factor indicates that a subtree rooted at a node is unbalanced, the tree is rebalanced by performing one or more tree rotations. Generally, the AVL tree at 200 illustrates one such rotation.

At 202, the AVL tree is illustrated having a "left-right" configuration. This configuration of the AVL tree may result from node insertion. In the configuration illustrated at 202, node 204 corresponds to a record having a data value of five (5), and a balance factor of two (2). This balance factor indicates that the subtrees of node 204 are unbalanced such that the height of the left subtree of node 204 is greater than that of the right subtree of node 204. The left subtree of node 204, which is rooted at node 206 (which has a value of three (3)), is then considered. If the left subtree rooted at node 206 does not lean to the right, as is the case at 208 (a "left-left" configuration), then the AVL tree can be balanced simply by performing a rotation to the right to result in the "balanced" configuration illustrated at 210. In the configuration illustrated at 210, the AVL tree has been rotated such that node 212, which has a value of four (4), becomes the root node, and such that node 212 has a left subtree rooted at node 206 and a right subtree rooted at node 204.

It can be determined that the left subtree rooted at node 206 does not lean to the right given the balance factor of node 206. A balance factor of zero (0) or one (1) indicates that the left subtree does not lean to the right. If the left subtree rooted at node 206 leans to the right, as is the case at 202, that subtree is first rotated to the left to result in the left-left configuration illustrated at 208. It can be determined that the left subtree rooted at node 206 leans to the right given the balance factor of node 206. A balance factor of negative one (−1) indicates that the left subtree leans to the right. Once the rotation is performed to result in the left-left configuration illustrated at 208, the AVL tree can then be balanced by performing a rotation to the right to result in the balanced configuration illustrated at 210.

The rotation to rebalance the AVL tree illustrated in FIG. 2 and described just above should not be considered to limit the scope of AVL operations that may be performed in accordance with hardware-implemented AVL tree module techniques. For example, rotating an AVL tree having a right-left configuration to a right-right configuration, and then to a balanced configuration is contemplated within the scope of the techniques described herein. Other rotations and operations performed in accordance with the rules of AVL trees are also to be considered within the scope of the techniques described herein.

FIG. 3 illustrates an example of data records for hardware-implemented AVL tree module techniques that can be updated with a single read from and write to memory in accordance with one or more aspects at 300. Alternately, the data records can be updated with a multiple-cycle read from and write to memory (e.g., a burst operation). The data records at 300 may correspond to at least some of the data records 118 at the access point 102. In any case, the data records illustrated at 300 can be maintained in a memory as an AVL tree table. Each AVL tree table can be identified by a tree identifier and each record in the tree associated with a unique index. The unique index can be used as the address in memory, although an index of zero is reserved. The records, although associated with a unique index, may not be unique. Furthermore, each data record may include elements such as a data value (e.g., a key), a balance factor, a pointer to a left subtree, and a pointer to a right subtree. Each data record may contain additional elements without departing from the scope of the techniques described herein.

Continuing with the example above, in which the data records each correspond to a wireless device, the data value of a particular record may correspond to the identifying information that identifies a particular wireless device. Thus, the identifying information of wireless devices known to the access point 102 may be organized according to an AVL tree. In this way, a data record corresponding to a particular wireless device may be found using an AVL tree search of the data records. Once the data record is found, other information associated with the wireless device and that enables communication with the access point 102 may then be accessed. Due to the speed with which an AVL tree search is capable of finding a record (and thus accessing other associated information), communication protocols that utilize data maintained as an AVL tree may be capable of greater throughput than conventional protocols that are limited by the speed with which a record for a wireless device can be found.

Returning to the discussion of the data records at 300, the data records may represent nodes of the AVL tree illustrated in FIG. 2. The data records at 302, for example, may correspond to the left-right configuration of the AVL tree illustrated at 202. Each of the data records at 302 may represent a node of the AVL tree illustrated at 202. The data records at 304, however, may correspond to the balanced configuration of the AVL tree illustrated at 210. Each of the data records at 304 may represent a node of the AVL tree illustrated at 210. The records at 304 may have been updated to reflect the rotation to rebalance the AVL tree that is illustrated in FIG. 2.

With reference again to the discussion of FIG. 1, AVL tree agent 120 may be employed to update data records that are stored as an AVL tree. In one implementation, AVL tree agent 120 can be embodied on CRM 116 (as shown). Alternately or additionally, AVL tree agent 120 may be implemented in whole or part as hardware logic or circuitry integrated with or separate from other components of access point 102 (e.g., wireless transceiver 108). In aspects, the AVL tree agent 120 initiates one or more AVL tree operations for the hardware-implemented AVL tree module techniques.

Access point 102 is also shown including an AVL tree module 122. Although AVL tree agent 120 and AVL tree module 122 are illustrated as part of an access point 102 for wireless communication, it should be appreciated that use of these components for other applications is well within the scope of the techniques described herein. For example, AVL tree agent 120 and AVL tree module 122 can be used in conjunction with applications that manage requests for a limited resource or resources—e.g., an application that manages high volumes of callers and/or internet requests for tickets to an event, in which calls and internet requests can be added as placed, can be dropped as satisfied or due to error, and can be given an order with which the application is to initiate a response to the calls and requests. Still, use in conjunction with managing requests for a resource is simply one other example in which the AVL tree agent 120 and AVL tree module 122 can be used. The AVL tree agent 120 and AVL tree module 122 can be used for other applications that are not described herein without departing from the scope of the described techniques.

AVL tree module 122 is a hardware module that can perform table search, record insertion, record deletion, and table balancing, according to AVL tree techniques. A list of particular functions that the AVL tree module 122 can perform, and that are discussed in more detail just below, include: a find function, a find greater than function, a find next function, a find first function, a read function, an insert function, a delete function, and a delete by index function. Pertinent to the discussion of these functions is the structure of, and information associated with, the AVL trees. As discussed briefly above, each AVL tree table can be identified by a tree identifier and each record in the tree associated with a unique index. The unique index can be used as the address of a record in memory. A record may not, however, be assigned an index of zero (0) because zero is reserved e.g., for error conditions. Further, the records, although associated with a unique index, may be duplicative of other records, and each data record may include various elements such as a data value (e.g., a key).

The Find Function

As input, the "find" function is configured to take an argument that corresponds to a key. Given the input key, the find function finds a record in the AVL tree table having a key that matches the input key. The find function then returns the index of the record for which the key matches the input key, and a key of that record. If there are multiple records in the AVL tree table that have keys matching the input key, just information for the first data record that is found to have the matching key is returned.

The Find Greater than Function

As input, the "find greater than" (FGT) function is configured to take an argument that corresponds to a key. Given the input key, the FGT function finds the record in the AVL tree table with a key that is next biggest in value relative to the input key. In accordance with AVL tree techniques, nodes of a balanced AVL tree are arranged such that nodes to the left of a given node have a key less than or equal to the given node and nodes to the right of the given node have a key greater than or equal to the given node. The FGT function then returns the index of the record with the key that is the next biggest in value relative to the input key. The FGT function returns the key of the record with its index.

The Find Next Function

As input, the "find next" (FN) function is configured to take an argument that corresponds to an index of a record. Given the input index, the FN function finds the record in the AVL tree table that is next to, and to the right of, a record associated with the input index. This function may have the same effect as the FGT function, however, the FN function takes an index as input rather than a key. The FN function returns the index as well as the key of the record that is next to the record associated with the input index.

The Find First Function

The "find first" (FF) function does not take any arguments as input. When called, the FF function simply finds the record that corresponds to the leftmost node in the AVL tree. This is the record that has the smallest key of the records that are part of the AVL tree. The FF function returns index as well as the key of the record that corresponds to the leftmost node in the AVL tree.

The Read Function

As input, the "read" function is configured to take an argument that corresponds to an index of a record. Given the input index, the read function will access the record that corresponds to the input index to extract its data value. The read function can then return the data value of the record as well as the input index itself.

The Insert Function

As input, the "insert" function is configured to take arguments that correspond to a key and an index for a record that is to be inserted into the AVL tree. Given the key and the index, the insert function inserts a new record having this information into the AVL tree. As part of inserting the new record, the insert function can cause the AVL tree table to be rebalanced. The key of the new record may not be unique among the records in the AVL tree table. When this is the case, the order of records with the duplicate keys is based on the index of those records. The insert function returns both the index and the key of the inserted data record.

The Delete Function

As input, the "delete" function is configured to take an argument that corresponds to a key having a certain value. Given the value of the key, the delete function deletes an existing record in the AVL tree table that has a key with a matching value. As part of deleting the existing record, the delete function causes the AVL tree to be rebalanced. When multiple records in the AVL tree have a key that matches the value of the input key, the delete function simply deletes the first of those records that is found. When the delete function successfully deletes a record, the key and the index of the deleted record are returned. If no record has a key with the certain value in the AVL tree table, an error condition is generated and the delete function returns zero (0) for both the key and the index (zero being an invalid index number and indicative of the error condition).

The Delete by Index Function

As input, the "delete by index" (DBI) function is configured to take an argument that corresponds to an index of a record. Given the index, the DBI function deletes any records corresponding to the index. When multiple records correspond to the input index, each of the multiple records that correspond to the input index is deleted. As part of deleting the records corresponding to the index, the DBI function causes the AVL tree to be rebalanced. When the DBI function is successful, the key and index for deleted records are returned. If a record corresponding to the input index is not found in the AVL tree table, an error condition is generated and the DBI function returns zero (0) for both the key and the index (zero being an invalid index number and indicative of the error condition).

Figure 4:
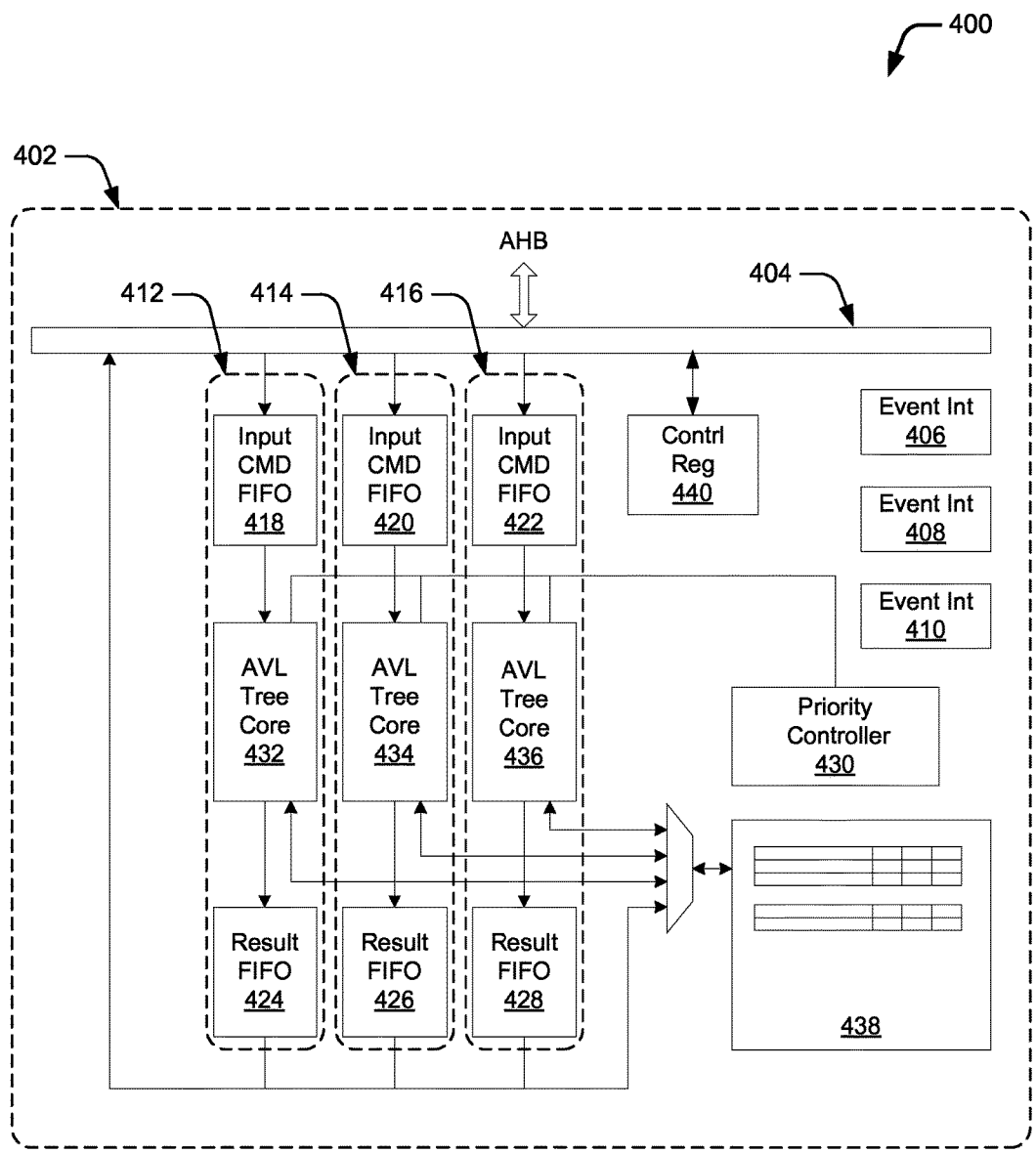
FIG. 4 illustrates an example of an AVL tree module capable of performing AVL tree operations in accordance with one or more aspects.

Having discussed functions that AVL tree module 122 can perform, a discussion regarding implementation details of an AVL tree module, such as AVL tree module 122, follows. FIG. 4 illustrates an example of an AVL tree module capable of performing AVL tree operations in accordance with one or more aspects at 400.

In the example at 400, AVL tree module 402 is shown having two interfaces: an Advanced High-performance Bus (AHB) Lite interface 404 and event interfaces 406, 408, 410. These interfaces enable the AVL tree module 402 to interact with other components. For example, the AVL tree module 402 can be attached to a shared bus, such as an SMAC fabric, to support agents connected to the shared bus The AVL tree module 402 also includes hardware threads (e.g., ports) of fixed priorities. In the example illustrated at 400, AVL tree module 402 includes high-priority hardware thread 412, medium-priority hardware thread 414, and low-priority hardware thread 416. Inclusion of these three threads, can enable up to three (3) agents on a shared bus (e.g., the SMAC fabric) to access the AVL tree module 402 at a same time. To do so, the agents may use a single AHB connection.

Each of high-priority hardware thread 412, medium-priority hardware thread 414, and low-priority hardware thread 416 includes a respective input command first in first out (FIFO) 418, 420, 422 and a respective result output FIFO 424, 426, 428. The input command FIFO for each of these hardware threads has its own memory mapped addresses. In implementations, an input command for the AVL tree module 402 has 73 bits of information and includes 48 bits for data, 13 bits for index, 3 bits for operation command code (see Table 1 for details), 5 bits for a tree identifier, 3 bits for a command serial number, and 1 bit for clearing a result output FIFO. To complete the entry of one such command, three 32-bit AHB write operations are performed. A command is considered to be completely written into an input command FIFO after the lower 32 bits of the command are written through AHB to the input command FIFO. When an input command FIFO is no longer empty, the corresponding hardware thread automatically starts processing operations according to the received commands. The 3-bit command serial number that is included in the input command is used to match output results of operations at the respective result output FIFO. The input command FIFOs can be cleared by writing to a FIFO reset register. Further, when an input command FIFO is full an interrupt can be generated that indicates the input command FIFO is full.

The result output FIFO for each of high-priority hardware thread 412 (e.g., result output FIFO 424), medium-priority hardware thread 414 (e.g., result output FIFO 426), and low-priority hardware thread 416 (e.g., result output FIFO 428) has memory mapped addresses that the result output FIFO reads. Output results, which are the results of the operations performed by hardware threads, are stored in result output FIFOs 424, 426, 428. In implementations, an output result for the AVL tree module 402 has 75 bits of information and includes 48 bits for return data, 13 bits for return index, 3 bits for a command code, 3 bits for a status (see Table 1 for details), 5 bits for a tree identifier, and 3 bits for a command serial number to match an input command.

In operation, an output result can be popped by default from the result output FIFO after reading the lower 32 bits of return data of the output result. Alternately, a manual mode can be set using bit zero of the control register so that the result output FIFO cannot be popped without writing to an output FIFO pop register of the corresponding hardware thread. When a result output FIFO is full, an interrupt can be generated that indicates the result output FIFO is full. An interrupt can also be generated when the result output FIFO of any of the hardware threads is not empty, which is effective to indicate that results are available in a result output FIFO.

Interrupts generated for the input command FIFO or result output FIFO of a particular thread can be generated by a respective interrupt event interface dedicated to the particular thread. An interrupt generated for the input command FIFO 418 of the high-priority hardware thread 412 can be generated by an interrupt event interface dedicated to the high-priority hardware thread 412, for example. Each interrupt event interface can mask an event by setting event mask register bits in the register.

In implementations, both the input command FIFOs 418, 420, 422 and result output FIFOs 424, 426, 428 can be four (4) levels deep. In this way, up to four (4) outstanding AVL tree operations can be batched in the input command FIFOs. The input command FIFOs 418, 420, 422 and result output FIFOs 424, 426, 428 can be cleared of pending commands and output results, respectively, with a register write by software. The result output FIFO can also be cleared by the first input command of a command batch.

As discussed briefly above, the AVL tree module 402 can be shared by multiple agents at a same time. This sharing can be synchronized by priority controller 430. Priority controller 430 can synchronize the sharing of AVL tree module 402 using mutexes. Mutexes are synchronization primitives that grant access of shared resources to only one thread at a time. If a thread acquires a mutex, the second thread that requests acquisition of the mutex is suspended until the first thread releases the mutex. Priority controller 430 can distribute mutexes to agents that request to use a hardware thread, for example. Agents that request to use any of the three hardware threads (e.g., high-priority hardware thread 412, medium-priority hardware thread 414, and low-priority hardware thread 416) must obtain a corresponding mutex from priority controller 430 before using the requested thread. Once an agent finishes an AVL tree operation on a thread, the agent releases the mutex for that thread so that another agent can request the mutex. High-priority hardware thread 412, medium-priority hardware thread 414, and low-priority hardware thread 416 are associated with three (3) mutexes, which have corresponding priorities of high, medium, and low.

In operation, high-priority hardware thread 412 halts both the medium-priority hardware thread 414 and the low-priority hardware thread 416, except when memory is being updated by either of those lower priority threads. When that is the case, control is switched to high-priority hardware thread 412 as soon as medium-priority hardware thread 414 or low-priority hardware thread 416 has finished updating memory. Operations of medium-priority hardware thread 414 and low-priority hardware thread 416 are then placed on hold until each operation of high-priority hardware thread 412 has been completed (e.g., when the input command FIFO of high-priority hardware thread 412 is empty).

If medium-priority hardware thread 414 is performing AVL tree operations when high-priority hardware thread 412 starts, medium-priority hardware thread 414 will immediately yield to high-priority hardware thread 412, such as when medium-priority hardware thread 414 is performing a search of the AVL tree table. When medium-priority hardware thread 414 is performing an update to memory, however, it will not yield to high-priority hardware thread 412 until the update is complete. Medium-priority hardware thread 414 begins performing the operations in its input command FIFO, when there are no high priority operations; in other words, when the input command FIFO of the high-priority hardware thread 412 is empty. With relation to low-priority hardware thread 416, medium-priority hardware thread 414 halts operations of low-priority hardware thread 416, except when memory is being updated by low-priority hardware thread 416. When that is the case, control is switched to the medium-priority hardware thread 414 as soon as low-priority hardware thread 416 has finished updating memory. Low-priority hardware thread 416 then holds its operations so that medium-priority hardware thread 414 can begin performing operations.

Low-priority hardware thread 416 begins performing its operations when there are no pending operations in either of the high-priority hardware thread 412 or the medium-priority hardware thread 414; in other words, after the input FIFO of both the high-priority hardware thread 412 and the medium-priority hardware thread 414 thread is empty.

In implementations, high-priority hardware thread 412 and medium-priority hardware thread 414 are used for timing-critical AVL table searches, such as the table searches performed when the find function, the FGT function, the FN function, and the FF function are called. Since operations of the high-priority hardware thread 412 are generally executed immediately, the high-priority hardware thread 412 can be reserved for timing-critical operations (e.g., search operations). Since the medium-priority hardware thread 414 blocks operations of the low-priority hardware thread 416, the medium-priority hardware thread 414 can also be limited to timing-critical operations (e.g., search operations).

The low-priority hardware thread 416 can be used for operations that take longer amounts of time than search operations. Low-priority hardware thread 416 can be used for AVL tree operations related to AVL tree table maintenance, such as to add records to the AVL tree table or to remove records therefrom. These operations can take a longer amount of time than search operations, in part, because they involve updates to memory. To avoid blocking operations of high-priority hardware thread 412 and medium-priority hardware thread 414 with updates to memory, low-priority hardware thread 416 can be prohibited from performing operations during critical timing periods. In this way, blockage due to a memory update can be avoided during the critical timing periods. To prohibit the low-priority hardware thread 416 from performing operations during critical timing periods, the corresponding low-priority mutex can be attached to a policy that only allows the mutex to be obtained for use of the low-priority hardware thread 416 during non-critical timing periods.

In the example at 400, each of the high-priority hardware thread 412, medium-priority hardware thread 414, and low-priority hardware thread 416 also includes a respective AVL tree core 432, 434, 436. AVL tree cores 432, 434, 436 perform the operations queued in the corresponding hardware thread. AVL tree core 432, for instance, is the component of high-priority hardware thread 412 that performs the timing-critical AVL table searches, such as the table searches performed when the find function, the FGT function, the FN function, and the FF function are called. Once AVL tree core 432 performs one such function, any results that result from the performance are loaded into result output FIFO 424. In a similar manner, AVL tree core 434 performs the operations written to input command FIFO 420 of medium-priority hardware thread 414 e.g., search operations. To perform the operations written to input command FIFO 422 of the low-priority hardware thread 416, AVL tree core 436 is used. Thus, AVL tree core 436 generally performs operations that take a longer amount of time than search operations, such as those related to AVL tree table maintenance. The results of AVL tree operations performed by AVL tree cores 434, 436 are written to the corresponding result output FIFOs 426, 428.

AVL tree module 402 also includes AVL memory 438. AVL memory 438 can be accessed directly using a set of access registers. To do so, a starting address of the memory can be programmed into a particular register, such as an AVL debug register. In an implementation, each location in AVL memory 438 can have 77 bits. To read a memory location, therefore, three 32-bit AHB reads can be used. When the lower 32 bits of a memory location are read, an address of the location is automatically incremented to a next higher address. In this way, sequential memory locations in AVL memory 438 can be read. With regard to writing to AVL memory 438, after an address register is programmed, a write to a lower 32 bits of a memory location causes an address of the location to automatically increment to a next higher address. In this way, writing to sequential memory locations in AVL memory 438 is enabled.

Part of reading from and writing to AVL memory 438 can involve converting an AVL index into a memory address. If it is assumed that a block of contiguous memory space is available in memory for an AVL tree table, and that a block of contiguous indexes are used for the AVL tree represented by the AVL tree table, AVL tree indexes can be mapped to memory addresses according to the following:

memAddress=memAddressBase+(AVLIndex−AVLIndexBase)×blockSizeInBytes

The term memAddress represents the address in AVL memory 438 of a given record in the AVL tree table. The term memAddressBase represents a starting address in AVL memory 438 of the AVL tree table that includes the given record. The term AVLIndex represents the AVL tree index associated with the given record. The term AVLIndexBase represents a starting index of the block of indexes designated for the AVL tree table that includes the given record. Further, the term blockSizeInBytes represents a size in memory of the given record. This conversion can be performed by AVL tree cores 432, 434, 436 as part of performing AVL tree operations (e.g., search, insert, delete, and so on).

Returning to the discussion of the interfaces that enable AVL tree module 402 to interact with other components, event interfaces 406, 408, 410 can each correspond to a different hardware thread (e.g., high-priority hardware thread 412, medium-priority hardware thread 414, and low-priority hardware thread 416). Each event interface 406, 408, 410 can generate events based on a status of components in the corresponding hardware thread, such as a "results available" event, an "input command FIFO full" event, and a "result output FIFO full" event. The results available event can be generated by an event interface 406, 408, 410 when results of an AVL tree operation are stored in the result output FIFO 424, 426, 428 of the corresponding hardware thread. The input command FIFO full event can be generated by an event interface 406, 408, 410 when a maximum number of commands are queued in the input command FIFO 418, 420, 422 of the corresponding hardware thread. The result output FIFO full event can be generated by an event interface 406, 408, 410 when a maximum number of operation results are stored in the result output FIFO 424, 426, 428 of the corresponding hardware thread.

Other events related to the techniques described herein can also be generated. An event can be generated when a maximum number of records have been inserted into an AVL tree table, for example. To determine whether an AVL tree table has reached its maximum number of records, a count corresponding to a number of records in the AVL tree table can be tracked. The number of records in an AVL tree can be included in a total count register associated with the AVL tree, for example. When an AVL tree table is removed, the corresponding count can be set to zero (0). When records are inserted into an AVL tree table, the corresponding count can be updated to reflect a number of records inserted. Further, when records are deleted from an AVL tree table, the corresponding count can be updated to reflect a number of records deleted. To determine whether the maximum number of records has been reached for an AVL tree, the count can be read from the total count register associated with the AVL tree and compared to the maximum number. In some implementations, the maximum number of records in an AVL tree table is 8192, although greater or fewer records may be included in an AVL tree table without departing from the scope of the techniques described herein.

In addition, AVL tree module 402 includes control registers 440. Individual registers of control registers 440 can be read from and written to to enable the AVL tree module 402 to perform AVL tree operations according to the AVL tree techniques described above. As an example of how control registers 440 can be configured, consider Table 1, which shows a particular configuration of control registers 440 and attributes of the individual registers, including a name of the register, an address offset of the register, a field name of the register, whether the register can be read from or written to, a number of bits of the register, and a brief description regarding allocation of the bits.

TABLE 1

| Register Name | Address Offset | Field Name | R/W | Bits | Description |
|---|---|---|---|---|---|
| High Priority Port AVL_FIFO_ctl0 | 0x0000 | | | | |
| | | manual FIFO pop | R/W | [0] | When set to "1", output FIFO can only be popped by writing to FIFO pop register AVL_OFIFO_pop0. |
| | | Event mask | R/W | [3:0] | Set to "1"to mask out the event: [0]: Result available event, [1]: Command FIFO full. [2]: Result FIFO full. [3]: Max number of entry reached. [1:3] are for debug only. They should be masked out under normal |
| AVL_CMD_IN_0 | 0x0004 | Avl_index | R/W | [12:0] | The index associated with the entry that is to be operated on. It will be used as address to store the data into AVL memory. Zero value is reserved. |
| | | Avl_cmd | R/W | [15:13] | AVLTree command codes: 1. 3'b100: FIND 2. 3'b101: FINDGT 3. 3'b110: FIND FIRST 4. 3'b111: FIND NEXT 5. 3'b000:READ 6. 3'b001: INSERT(ADD) 7. 3'b010: DELETE BY KEY 8. 3'b011: DELETE BY INDEX Avl_Tree_id for the targeted AVL Tree table with current operation. |
| | | Transaction ID | R/W | [23:21] | Transaction ID. This is a user assigned value used to associate output results with input commands, only valid within same batch of commands. It is the users' responsibility to keep it unique. |
| | | Output FIFO clear | R/W | [24] | When set to "1", corresponding output FIFO will be cleared before this operation starts. |
| AVL_DI_H_0 | 0x0008 | Avl_data_H | R/W | [15:0] | Upper 16 bits of the 48 bits data value in the table. |

TABLE 1-continued

| Register Name | Address Offset | Field Name | R/W | Bits | Description |
|---|---|---|---|---|---|
| AVL_DI_L_0 | 0x000C | Avl_data_L | R/W | [31:0] | Lower 32 bits of the 48 bits data value in the table. |
| AVL_OUT_0 | 0x0014 | AVL_index | R | [12:0] | The index returned by AVL tree operation. Zero means no entry found and operation failed. When memory address conversion is enabled, this is the LSB 13bits of memory address. |
| | | Avl_cmd | R/W | [15:13] | AVL Tree command codes executed in the operation:<br>1. 3'b100: FIND<br>2. 3'b101: FINDGT<br>3. 3'b110: FIND FIRST<br>4. 3'b111: FIND NEXT<br>5. 3'b000 : READ<br>6. 3'b001: INSERT(ADD)<br>7. 3'b010: DELETE BY KEY<br>8. 3'b011: DELETE BY INDEX |
| | | AVL_status | R | [18:16] | [16]: "1" = Table size reach half maximum size −4096.<br>[17]: "1" = Node not found in the table.<br>[18]: "1" = Error occurred. For search type of commands, this means data not found by search. For delete commands, this means entry did not exist. |
| | | Avl_tree_id | R | [23:19] | AVL Tree ID used in this operation that generated this result. |
| | | Transaction ID | R | [26:24] | Transaction ID. This is a user assigned value used to associate output results with input commands. This result is from the input command with same transaction ID. |
| | | | R | [30:28] | When memory address conversion is enabled, this is memory address [31:29]. |
| AVL_DO_H_0 | 0x0018 | Avl_data_H | R | [15:0] | Upper 16 bit of the returned 48bit data value. |
| | | | R | [31:16] | When memory address conversion is enabled, this is the memory address [28:13]. |
| AVL_DO_L_0 | 0x001C | Avl_data_L | R | [31:0] | Lower 32 bit of the returned 48bit data value |
| AVL_FIFO_RST0 | 0x0010 | | W | | Clear both input and output FIFOs. One hot register, write only |
| Medium Priority Port | | | | | |
| AVL_FIFO_ctl1 | 0x00020 | | | | |
| | | manual FIFO pop | R/W | [0] | When set to "1", output FIFO can only be popped by writing to FIFO pop register AVL_OFIFO_pop1 |

TABLE 1-continued

| Register Name | Address Offset | Field Name | R/W | Bits | Description |
|---|---|---|---|---|---|
| | | Event mask | R/W | [3:0] | Set to "1" to mask out the event:<br>[0]: Result available event,<br>[1]: Command FIFO full,<br>[2]: Result FIFO full.<br>[3]: Max number of entry reached.<br>[1:3]are for debug only. |
| AVL_DI_L_0 | 0x000C | Avl_data_L | R/W | [31:0] | Lower 32 bits of the 48 bits data value in the table. |
| AVL_OUT_0 | 0x0014 | AVL_index | R | [12:0] | The index returned by AVL tree operation. Zero means no entry found and operation failed. When memory address conversion is enabled, this is the LSB 13bits of memory address. |
| | | Avl_cmd | R/W | [15:13] | AVL Tree command codes executed in the operation:<br>1. 3'b100: FIND<br>2. 3'b101: FINDGT<br>3. 3'b110: FIND FIRST<br>4. 3'b111: FIND NEXT<br>5. 3'b000 : READ<br>6. 3'b001: INSERT(ADD)<br>7. 3'b010: DELETE BY KEY<br>8. 3'b011: DELETE BY INDEX |
| | | AVL_status | R | [18:16] | [16]: "1" = Table size reach half maximum size –4096.<br>[17]: "1" = Node not found in the table.<br>[18]: "1" = Error occurred. For search type of commands, this means data not found by search. For delete commands, this means entry did not exist. |
| | | Avl_tree_id | R | [23:19] | AVL Tree ID used in this operation that generated this result. |
| | | Transaction ID | R | [26:24] | Transaction ID. This is a user assigned value used to associate output results with input commands. This result is from the input command with same transaction ID. |
| | | | R | [30:28] | When memory address conversion is enabled, this is memory address [31:29]. |
| AVL_DO_H_0 | 0x0018 | Avl_data_H | R | [15:0] | Upper 16 bit of the returned 48bit data value. |
| | | | R | [31:16] | When memory address conversion is enabled, this is the memory address [28:13]. |
| AVL_DO_L_0 | 0x001C | Avl_data_L | R | [31:0] | Lower 32 bit of the returned 48bit data value |

TABLE 1-continued

| Register Name | Address Offset | Field Name | R/W | Bits | Description |
|---|---|---|---|---|---|
| AVL_FIFO_RST0 | 0x0010 | | W | | Clear both input and output FIFOs. One hot register, write only |
| Medium Priority Port | | | | | |
| AVL_FIFO_ctl1 | 0x00020 | | | | |
| | | manual FIFO pop | R/W | [0] | When set to "1", output FIFO can only be popped by writing to FIFO pop register AVL_OFIFO_pop1. |
| | | Event mask | R/W | [3:0] | Set to "1" to mask out the event:<br>[0]: Result available event,<br>[1]: Command FIFO full,<br>[2]: Result FIFO full.<br>[3]: Max number of entry reached.<br>[1:3]are for debug only. They should be masked out under normal operations. |
| AVL_CMD_IN_1 | 0x00024 | Avl_index | R/W | [12:0] | The index associated with the entry that is to be operated on. It will be used as address to store the data into AVL memory. Zero value is reserved. |
| | | Avl_cmd | R/W | [15:13] | AVL Tree command codes:<br>1. 3'b100: FIND<br>2. 3'b101: FINDGT<br>3. 3'b110: FIND FIRST<br>4. 3'b111: FIND NEXT<br>5. 3'b000 : READ<br>6. 3'b001: INSERT(ADD)<br>7. 3'b010: DELETE BY KEY<br>8. 3'b011: DELETE BY INDEX |
| | | Avl_tree_id | R/W | [20:16] | AVL Tree ID. It is used to identify the table (AVL tree) inside memory. |
| | | Transaction ID | R/W | [23:21] | Transaction ID. This is a user assigned value used to associate output results with input commands, only valid within same batch of commands. It is the users' responsibility to keep it unique. |
| | | Output FIFO clear | R/W | [24] | When set to "1", corresponding output FIFO will be cleared before this operation starts. |
| AVL_DI_H_1 | 0x00028 | Avl_data_H | R/W | [15:0] | Upper 16 bits of the 48 bits data value in the table. |
| AVL_DI_L_1 | 0x0002C | Avl_data_L | R/W | [31:0] | Lower 32 bits of the 48 bits data value in the table. |
| AVL_OUT_1 | 0x0034 | AVL_index | R | [12:0] | The index returned by AVL tree operation. Zero means no entry found and operation failed. When memory address conversion is enabled, this is the LSB 13bits of memory address. |

TABLE 1-continued

| Register Name | Address Offset | Field Name | R/W | Bits | Description |
|---|---|---|---|---|---|
| | | Avl_cmd | R/W | [15:13] | AVL Tree command codes executed in the operation:<br>1. 3'b 100: FIND<br>2. 3'b 101: FIN DGT<br>3. 3'b 110: FIND FIRST<br>4. 3'b 111: FIND<br>5. 3'b 000 : READ<br>6. 3'b 001:<br>7. 3'b 010: DELETE BY KEY<br>8. 3'b 011: DELETE BY INDEX |
| | | AVL_status | R | [18:16] | [16]: "1" = Table size reach half maximum size −4096.<br>[17]: "1" = Node not found in the table.<br>[18]: "1" = Error occurred. For search type of commands, this means data not found by search. For delete commands, this means entry did not exist. |
| | | Avl_tree_id | R | [23:19] | AVL Tree ID used in this operation that generated this result. |
| | | Transaction ID | R | [26:24] | Transaction ID. This is a user assigned value used to associate output results with input commands. This result is from the input command with same transaction ID. |
| | | | R | [30:28] | Whenmemory address conversion is enabled, this is memory address [31:29]. |
| AVL_DO_H_1 | 0x0038 | Avl_data_H | R | [15:0] | Upper 16 bit of the returned 48bit data value |
| | | | R | [31:16] | When memory address conversion is enabled, this is the memory address [28:13]. |
| AVL_DO_L_1 | 0x003C | Avl_data_L | R | [31:0] | Lower32 bit of the returned 48bit data value |
| AVL_FIFO_RST1 | 0x0030 | | W | | Clear both input and out FIFOs. One hot register, write only |
| Low Priority Port<br>AVL_FIFO_ctl2 | 0x0040 | | | | |
| | | manual FIFO pop | R/W | [0] | When set to "1", output FIFO can only be popped by writing to FIFO pop register AVL_OFIFO_pop2. |
| | | Event mask | R/W | [3:0] | Set to "1", to mask out the event:<br>[0]: Result available event,<br>[1]: Command FIFO full,<br>[2]: Result FIFO full.<br>[3]: Max number of entry reached.<br>[1:3]are for debug only. They should be masked out under normal operations. |

TABLE 1-continued

| Register Name | Address Offset | Field Name | R/W | Bits | Description |
|---|---|---|---|---|---|
| AVL_CMD_IN_2 | 0x0044 | Avl_index | R/W | [12:0] | The index associated with the entry that is to be operated on. It will be used as address to store the data into AVL memory. Zero value is reserved. |
| | | Avl_cmd | R/W | [15:13] | AVL Tree command codes:<br>1. 3'b 100: FIND<br>2. 3'b 101: FIN DGT<br>3. 3'b 110: FIND FIRST<br>4. 3'b 111: FIND NEXT<br>5. 3'b 000 : READ<br>6. 3'b 001: INSERT(ADD)<br>7. 3'b 010: DELETE BY KEY<br>8. 3'b 011: DELETE BY INDEX |
| | | Avl_tree_id | R/W | [20:16] | AVL Tree ID. It is used to identify the table (AVL tree) inside memory. |
| | | Transaction ID | R/W | [23:21] | Transaction ID. This is a user assigned value used to associate output results with input commands, only valid within same batch of commands. It is the users' responsibility to keep it unique. |
| | | Output FIFO clear | R/W | [24] | When set to "1", corresponding output FIFO will be cleared before this operation starts. |
| AVL_DI_H_2 | 0x0048 | Avl_data_H | R/W | [15:0] | Upper 16 bits of the 48 bits data value in the table. |
| AVL_DI_L_2 | 0x004C | Avl_data L | R/W | [31:0] | Lower 32 bits of the 48 bits data value in the table. |
| AVL_OUT_2 | 0x0054 | AVL_index | R | [12:0] | The index returned by AVL tree operation. Zero means no entry found and operation failed. When memory address conversion is enabled, this is the LSB 13bits of memory address. |
| | | Avl_cmd | R/W | [15:13] | AVL Tree command codes executed in the operation:<br>1. 3'b 100: FIND<br>2. 3'b 101: FIN DGT<br>3. 3'b 110: FIND FIRST<br>4. 3'b 111: FIND NEXT<br>5. 3'b 000 : READ<br>6. 3'b 001: INSERT(ADD)<br>7. 3'b 010: DELETE BY KEY<br>8. 3'b 011: DELETE BY INDEX |

TABLE 1-continued

| Register Name | Address Offset | Field Name | R/W | Bits | Description |
|---|---|---|---|---|---|
| | | AVL_status | R | [18:16] | [16]: "1" = Table size reach half maximum size −4096.<br>[17]: "1" = Node not found in the table.<br>[18]: "1" = Error occurred. For search type of commands, this means data not found by search. For delete commands, this means entry did not exist. |
| | | Avl_tree_id | R | [23:19] | AVL Tree ID used in this operation that generated this result. |
| | | Transaction ID | R | [26:24] | Transaction ID. This is a user assigned value used to associate output results with input commands. This result is from the input command with same transaction ID. |
| | | | R | [30:28] | When memory address conversion is enabled, this is memory address [31:29]. |
| AVL_DO_H_2 | 0x0058 | Avl_data_H | R | [15:0] | Upper 16 bit of the returned 48 bit data value |
| | | | R | [31:16] | When memory address conversion is enabled, this is the memory address [28:13]. |
| AVL_DO_L_2 | 0x005C | Avl_data_L | R | [31:0] | Lower 32 bit of the returned 48bit data value |
| AVL_FIFO_RST2 | 0x0050 | | W | | Clear both input and out FIFOs. One hot register, write only |
| AVL_OFIFO_POP0 | 0x0064 | AVL_ofifo_pop0 | W | | Pop High priority output FIFO. One hot, write only |
| AVL_OFIFO_POP1 | 0x0068 | AVL_ofifo_pop1 | W | | Pop Medium priority output FIFO. One hot, write only |
| AVL_OFIFO_POP2 | 0x006C | AVL_ofifo_pop2 | W | | Pop Low priority output FIFO. One hot, write only |
| AVL_ROOT_IDX | 0x0300-0x037C | AVL_root_index | R/W | [12:0] | AVL Tree root index for each table from 0 to 31 (0x300-0x37C). The index of the first data entry in a table is used as initial root index of the new table. Writing root index of a table to zero, in effect, removes the whole table. The root index may change during AVL operations. It will be automatically updated internally. Under normal operation, these registers should be read only. |
| AVL_NDCNT_ST | 0x0400-0x047C | AVL_node_count | R/W | [12:0] | AVL Tree node count for each table from 0-31(0x400-0x47C) |
| AVL_ADDR_BASE | 0x0480-0x04FC | AVL_addr_base | R/W | [31:0] | For memory address conversion, this is the base address of the table in memory for each table. |

TABLE 1-continued

| Register Name | Address Offset | Field Name | R/W | Bits | Description |
|---|---|---|---|---|---|
| AVL_INDX_BASE | 0x0500-0x057C | AVL_index_base | R/W | [12:0] | For memory address conversion, this is the base index of the table in memory for each table. |
| AVL_ENTRY_SIZE | 0x0580-0x05FC | AVL_entry_size | R/W | [31:0] | For memory address conversion, this is the table entry size of the table in memory for each table. |
| AVL_CTL _ | 0x0200 | Avl_ctl _ | R/W | [0] | Soft-reset. Writing this bit to reset the whole datapath and state machines in the core and memory. AHB interface and registers are not reset. Event src is also reset. |
| | | | | [1] | Set memory access to debug mode |
| | | | | [3:2] | Reserved |
| | | | | [4] | Enables memory address conversion on port 0. Memory address of table entry is outputted when index returned is not zero. |
| | | | | [5] | Enables memory address conversion on port 1. Memory address of table entry is outputted when index returned is not zero. |
| | | | | [6] | Enables memory address conversion on port 2. Memory address of table entry is outputted when index returned is not zero. |
| AVL_STATUS1 | 0x0204 | Avl_status1 | R | [26:0] | |
| | | | R | [0] | High priority port active status |
| | | | R | [1] | Medium priority port active status |
| | | | R | [2] | Low priority port active status |
| | | | R | [5:3] | Current avl_cmd code at High priority port |
| | | | R | [10:6] | Current table ID at High priority port |
| | | | R | [13:11] | Current avl_cmd code at Med priority port |
| | | | R | [18:14] | Current table ID at Med priority port |
| | | | R | [21:19] | Current avl_cmd code at Low priority port |
| | | | R | [26:22] | Current table ID at Low priority port |
| AVL_STATUS2 | 0x0208 | Avl_status2 | | | |
| | | | R | [0] | High priority output FIFO full |
| | | | R | [1] | High priority command FIFO full |
| | | | R | [2] | Med priority output FIFO full |
| | | | R | [3] | Med priority command FIFO full |
| | | | R | [4] | Low priority output FIFO full |
| | | | R | [5] | Low priority command FIFO full |
| AVL_TOTAL_CNT | 0x020C | Node_count_total | R | [12:0] | Total entry counts for all tables. The max is 8192. When this limit is reached, an event is generated to all ports. |

TABLE 1-continued

| Register Name | Address Offset | Field Name | R/W | Bits | Description |
|---|---|---|---|---|---|
| AVL_DBG_AD | 0x0070 | Avl_dbg_ad | R/W | | |
| | | | R/W | [12:0] | Memory address to start reading or writing |
| | | | R/W | [31] | "1" is write enabled. "0" is read. |
| AVL_DBG_W1 | 0x0074 | Mem_wdata[28:0] | R/W | [28:0] | Write to bit 0 to 28 of the memory location |
| AVL_DBG_W2 | 0x0078 | Mem_wdata[60:29] | R/W | [60:29] | Write to bit 29 to 60 of the memory location |
| AVL_DBG_W3 | 0x007C | Mem_wdata[76:61] | R/W | [76:61] | Write to bit 61 to 76 of the memory location |
| AVL_DBG_R1 | 0x0084 | Mem_rdata[28:0] | R | [28:0] | Read bit 0 to 28 of the memory location |
| AVL_DBG_R2 | 0x0088 | Mem_rdata[60:29] | R | [60:29] | Read bit 29 to 60 of the memory location |
| AVL_DBG_R3 | 0x008C | Mem_rdata[76:61] | R | [76:61] | Read bit 61 to 76 of the memory location |

Regardless of how the AVL tree module 122 is implemented specifically, the AVL tree agent 120 and AVL tree module 122 are configured to maintain and search through information organized as an AVL tree. The AVL tree agent 120 can request that the AVL tree module 122 perform an AVL tree search for a particular record among the data records 118 that are organized as the AVL tree. For example, the AVL tree agent 120 can request that the AVL tree module 122 perform the AVL tree search simply to locate a particular data record and access the information associated thereto.

The AVL tree agent 120 can also request that the AVL tree module 122 perform the AVL tree search as part of a search to update the AVL tree. The AVL tree search may be performed to determine where in the AVL tree one or more new nodes are to be inserted, for example. In the context of FIG. 1, new nodes may be inserted when a wireless device 104 sends a packet to the access point 102 to initiate communication therewith, and when the access point 102 does not yet have a record for the wireless device 104.

Further, the AVL tree search may be performed to locate a node in the AVL tree for deletion. When deleting a node, the AVL tree module 122 may access nodes in addition to those accessed as part of a conventional AVL tree search. The AVL tree module 122 can access the additional nodes as part of a search to delete a node in two cases. In both cases, a parent node of the node being deleted has both a left and a right subtree. In the first case, the node being deleted is a left subtree node of the parent node. In this first case, the AVL tree module 122 also accesses the right subtree node of the parent node (right child node), and the left subtree node of the right child node. In the second case, the node being deleted is the right subtree node of the parent node. In this second case, the AVL tree module 122 also accesses the left subtree node of the parent node (left child node), and the right subtree node of the left child node.

Although the AVL tree agent 120 can request that the AVL tree module 122 perform a search to determine where in an AVL tree one or more new nodes are to be inserted or to locate a node in the AVL tree for deletion, the AVL tree agent does not perform the search or the AVL tree operations attendant to an update—e.g., rotations that rebalance the AVL tree. Instead, the AVL tree operations that are performed in conjunction with an AVL tree update are performed by the AVL tree module 122.

The AVL tree module 122 can modify records that are written thereto to rebalance the corresponding AVL tree. In particular, the AVL tree module 122 can modify each of the records written thereto, and that are affected by an update, in parallel and without accessing memory. Such parallel modification results in maintenance operations being performed in less time than if such modifications were performed sequentially. By modifying those records without accessing memory, the AVL tree module 122 allows computing resources to be used for other tasks. Cycles of a central processing unit (CPU), for instance, need not be spent accessing each record of the AVL tree for each AVL tree rotation involved in an update. Rather, the AVL tree module 122 enables the records to be read from memory with a single read operation. Alternately, the data records can be read from memory with a multiple-cycle read operation (e.g., a burst operation). After the records affected by an update are modified by the AVL tree module 122, the modified records can then be written back to the memory with a single write operation.

When searching the data records that represent the nodes of the AVL tree, the AVL tree module 122 can read just a subset of those records from memory. To update an AVL tree, the AVL tree module 122 causes records representing just the nodes that are searched as part of the update to be read from memory and written to the hardware threads of AVL tree module 122. A subset of the records of an AVL tree may be searched to determine where in the AVL tree a new node is to be inserted, for example. That subset of records accessed as part of the search to implement the insertion is then written into the AVL tree module 122. In a similar manner, a subset of records of an AVL tree is searched to locate a particular node for deletion from the AVL tree. Those records that are accessed as part of the search to implement the deletion are then written to the AVL tree module 122.

Furthermore, the records that are written back to memory can be limited to those records that are modified by the AVL tree module 122. The AVL tree module 122 can modify the balance factor and subtree pointers of records written thereto to rebalance an AVL tree in accordance with AVL tree rebalancing techniques. AVL tree rebalancing techniques may not result in each of the records written to the AVL tree module 122 being modified for an update, however. Rather the modification may be limited to a subset of the records written to the AVL tree module 122. The AVL tree agent 120 receives an indication of the records that have been modified by the AVL tree module 122, and writes solely those records back to memory. When the AVL tree agent 120 writes the records back to the memory it is effective to update the AVL tree.

As discussed briefly above, each of the data records 118 maintained in an AVL tree arrangement can correspond to a particular wireless device. Wireless devices 104 are shown including mobile device 124, tablet device 126, and laptop computing device 128. Accordingly, the mobile device 124, tablet device 126, and laptop computing device 128 can each correspond to a data record at the access point 102 that is maintained as part of an AVL tree. Each of wireless devices 104 includes a wireless receiver 130 and a wireless transmitter 132 for providing a wireless interface 134 to communicate via various protocols or wireless networks, such as IEEE 802.11 or Bluetooth™. Wireless devices 104 operate in one or more communication modes, such as infrastructure, peer-to-peer, mesh, peer-link, and the like. Wireless receiver 130 and wireless transmitter 132 may be separate (shown) or combined (not shown) and may be hardware combined with or separate from firmware or software.

Wireless devices 104 are also illustrated as including processor(s) 136, computer-readable storage media 138 (device CRM 138). Wireless devices 104 are also illustrated as including MAC address 140 and Internet Protocol (IP) Address 142, which, in one implementation, are embodied on device CRM 138. MAC address 140 and IP address 142 may correspond to the identification information that access point 102 extracts from packets to identify the wireless devices 104. Additionally or alternately, the MAC address 140 and IP address 142 can be included in data records 118 associated with the wireless devices 104. The device CRM 138 may include any suitable memory or storage device, such as random-access memory (RAM), read-only memory (ROM), or Flash memory useful to store identifying information of the wireless device 104 or other applications and/or firmware of the wireless device 104.

Techniques for a Hardware-Implemented AVL Tree Module

The following discussion describes techniques for a hardware-implemented AVL tree module. These techniques can be implemented using the previously described environments or entities, such as AVL tree agent 120 and AVL tree module 122 of FIG. 1 embodied on access point 102. These techniques include methods illustrated in FIGS. 5 and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 5:
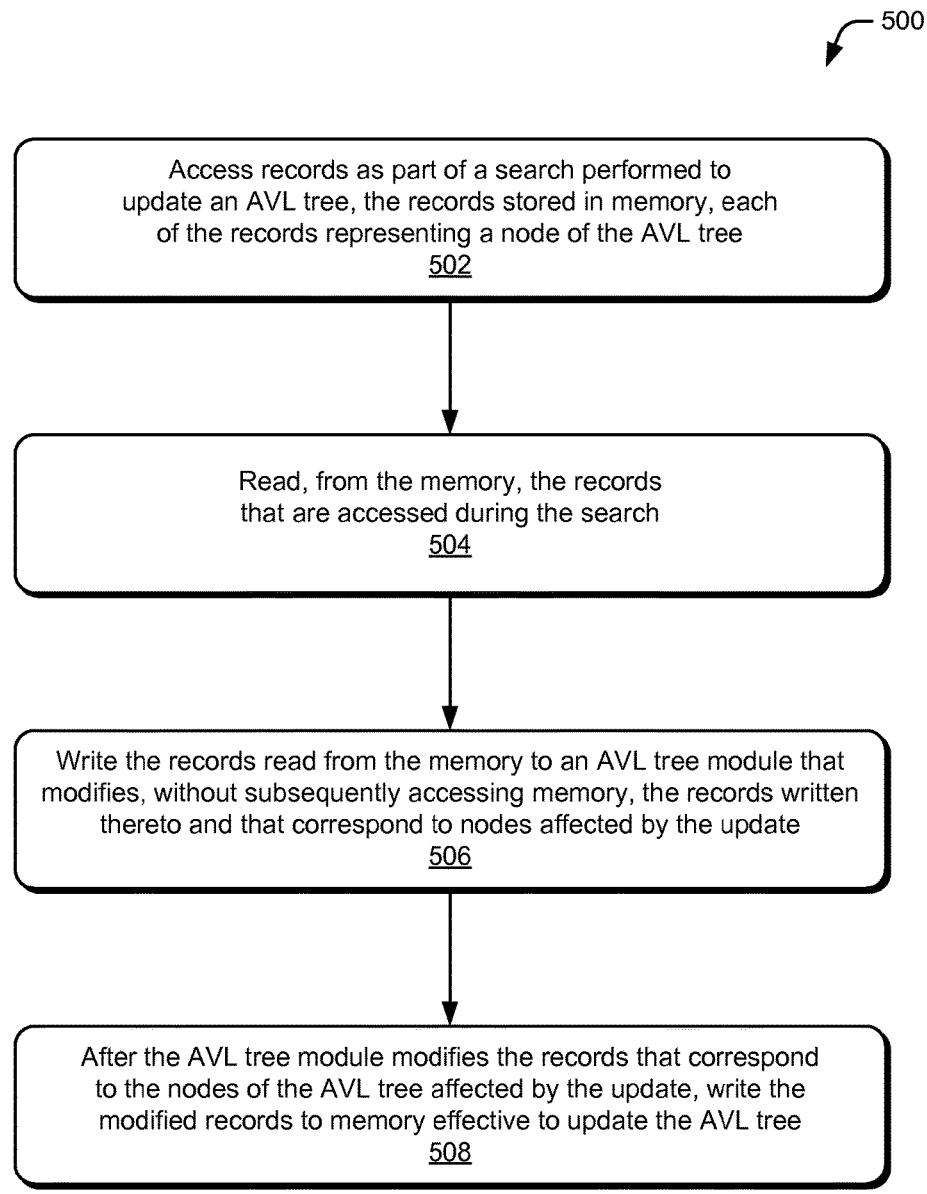
FIG. 5 illustrates a method for updating records organized according to an AVL tree using an AVL tree module rather than updating those records using a software implementation.

FIG. 5 depicts a method 500 for updating records organized according to an AVL tree using a hardware-implemented AVL tree module rather than updating those records using a software implementation.

At 502, one or more records are accessed as part of a search performed to update an AVL tree. The records are stored in a memory and each record represents a node of the AVL tree that is being updated. In the context of operating environment 100, at least some of the data records 118 are maintained in memory as an AVL tree. Each of the data records 118 maintained according to the AVL tree represents a node of the AVL tree. The AVL tree agent 120 performs an AVL search of the data records 118 that represent the nodes of the AVL tree to locate one or more of the records, such as to update the AVL tree. The AVL tree can be updated to insert additional nodes, and thereby add additional records to the data records 118. Alternately, the AVL tree can be updated to remove existing nodes, and thereby remove records from the data records 118. As discussed in more detail above, when deleting records representative of some nodes from the AVL tree, nodes are accessed in addition to those accessed according to a conventional AVL tree search.

At 504, the records that are accessed during the search are read from the memory. In the context of operating environment 100, the AVL tree agent 120 causes data records to be read from the memory that are maintained as part of the AVL tree and accessed during the search to update the AVL tree. The AVL tree agent 120 causes those data records to be read from the memory using a single read operation. Alternately, AVL tree agent 120 causes those data records to be read from memory with a multiple-cycle read operation.

At 506, the records that are read from the memory are written to a hardware-implemented AVL tree module. The hardware-implemented AVL tree module is configured to modify, without subsequently accessing the memory, the records that have been written thereto and that correspond to the nodes of the AVL tree that are affected by the update of the AVL tree. In the context of operating environment 100, the AVL tree agent 120 causes the records that are read from memory in act 504 to be written to the AVL tree module 122. The AVL tree agent 120 can cause the records read from memory in act 504 to be written to a stack of the AVL tree module 122, for example.

Once the records read from memory in act 504 are written to the AVL tree module 122, the AVL tree module 122 modifies the records according to the "rules" of AVL without accessing the memory. Specifically, the AVL tree module 122 modifies the records written thereto so that the AVL tree is "balanced" according to the rules of AVL trees, which are discussed in more detail above. To do so, the AVL tree module 122 without accessing memory can modify each of a balance factor of a record, a left subtree pointer of the record, or a right subtree pointer of the record. Further, the AVL tree module 122 may modify just a subset of the records that were written thereto in act 504. The records modified by the AVL tree module 122 are those for which at least one of the balance factor, the left subtree pointer, or the right subtree pointer is to change. Some of the records written to the AVL tree module 122 in act 504 may not be modified, such as those records that were checked as part of the search to update the AVL tree, but are not affected by a rebalancing of the AVL tree. In contrast to conventional techniques, the AVL tree module 122 modifies each of the records written thereto and that are affected by the update in parallel. Modifying the affected records in parallel enables maintenance operations on the AVL tree to be performed tree faster than if the records were modified serially.

At 508, after the hardware-implemented AVL tree module modifies the records that correspond to the nodes of the AVL tree affected by the update, the modified records are written to the memory effective to update the AVL tree. In the context of operating environment 100, the records modified by the AVL tree module 122 are written back to the memory. The records that are written back to the memory are limited to those modified by the AVL tree module 122. To do so, the AVL tree agent 120 can cause the modified records to be written back to memory using a single write operation. Alternatively, AVL tree agent 120 can cause the modified records to be written back to memory with a multiple-cycle write operation. Given that the AVL tree module 122 does not access memory while modifying records, the records maintained in memory are not updated until written back. In this way, the writing back is effective to update the records in memory and thus the AVL tree represented by those records.

Figure 6:
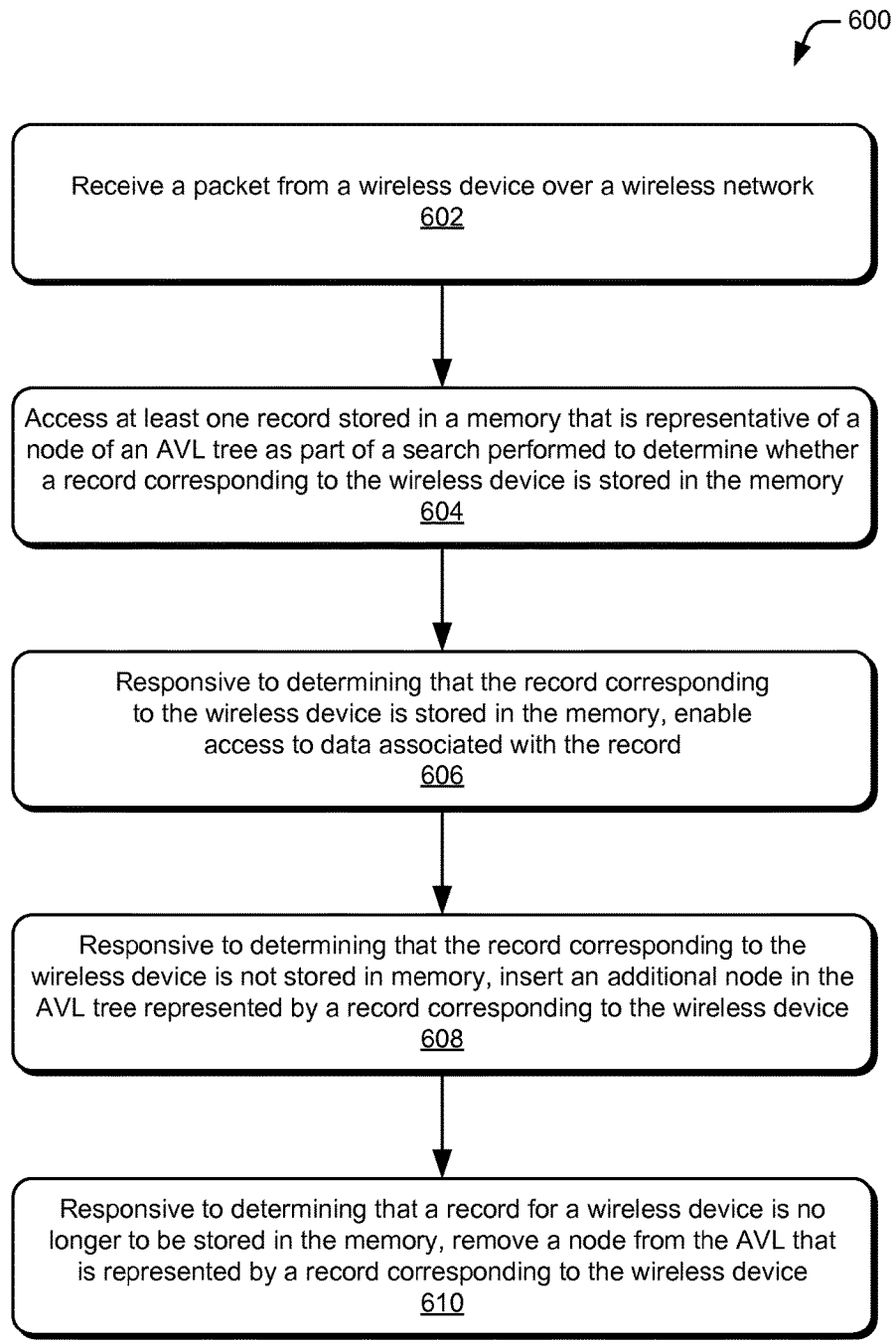
FIG. 6 illustrates a method for establishing a wireless connection between a wireless device and an access point that involves searching records that are organized according to an AVL tree, the organization of which is maintained using an AVL tree module.

FIG. 6 depicts a method 600 for establishing a wireless connection between a wireless device and an access point that involves searching records that are organized according to an AVL tree, the organization of which is maintained using a hardware-implemented AVL tree module.

At 602, a packet is received from a wireless device over a wireless network. In the context of operating environment 100, access point 102 receives a packet over communication link 106 from a wireless device 104.

At 604, at least one record that represents a node of an AVL tree is accessed from memory as part of a search performed to determine whether a record corresponding to the wireless device is stored in memory. In the context of operating environment 100, the AVL tree agent 120 causes an AVL tree search to be performed (e.g., by calling the "find" function) through data records 118 that are maintained as an AVL tree to locate a record for wireless device 104. The packet received from the wireless device 104 can include identifying information. Further, the data records 118 that are maintained as the AVL tree can each correspond to a particular wireless device that is associated with unique identifying information. Further, the data records maintained as the AVL tree can be arranged in the AVL tree using the identifying information. Accordingly, the AVL tree agent 120 can use the identifying information extracted from the received packet to request that a search be performed for the wireless device 104.

At 606, responsive to determining that a record corresponding to the wireless device is stored in memory, data associated with the record is accessed. In the context of operating environment 100, an AVL tree search locates a record of the wireless device 104 among the data records 118 maintained as the AVL tree. The record located by the AVL tree search can provide access to additional information about the wireless device. For example, the record located by the AVL tree search may provide a pointer to the additional information or an address of the additional information. By providing access to this additional information, the record can be considered associated with the additional information. In an environment in which a hardware-implemented AVL tree module is utilized by an access point for wireless communication, the additional data can correspond to channel data of a wireless device, manufacturer data, firmware data, authentication information, authorization information, and other data that may be used to communicate with the wireless device 104.

At 608, responsive to determining that a record corresponding to the wireless device is not stored in the memory, an additional node that is represented by a record corresponding to the wireless device is inserted in the AVL tree. In the context of operating environment 100, an AVL tree search does not locate a record corresponding to the wireless device 104. Consequently, a new record that corresponds to the wireless device 104 may be added to the data records 118 maintained as the AVL tree.

Although the AVL tree search does not locate a record corresponding to the wireless device 104, the AVL tree search nevertheless is effective to locate where in the AVL tree a node corresponding to the wireless device 104 is to be inserted. Accordingly, records checked during the AVL tree search are read from memory and committed to the AVL tree module 122. Information corresponding to the new node is also passed to the AVL tree module 122, e.g., by way of the "insert" function. Once the records are written to the AVL tree module 122, the AVL tree module 122 modifies the records according to the rules of AVL trees. After the records are modified by the AVL tree module 122, the modified records are written back to the memory, which is effective to include the new record as part of the AVL tree structure.

At 610, responsive to determining that a record for a wireless device is no longer to be stored in the memory, a node that is represented by a record corresponding to the wireless device is removed from the AVL tree. In the context of operating environment 100, a module (not shown) of the access point 102 can determine that a record for a wireless device is no longer to be stored with the data records 118 that are maintained as an AVL tree. This module may make such a determination, for example, if an IP address of the wireless device is expired. In any case, the record corresponding to the wireless device can be removed. To do so, the AVL tree agent 120 causes an AVL tree search to be performed to locate a record corresponding to the wireless device from among the data records maintained as an AVL tree. As described in more detail above, in some cases, additional nodes of the AVL tree are accessed to implement a deletion. Additionally, records that were accessed during the search are read from the memory and written to the AVL tree module 122. The record corresponding to the wireless device can then be deleted from memory. The AVL tree module 122 then modifies the records according to the rules of AVL trees.

System-on-Chip

Figure 7:
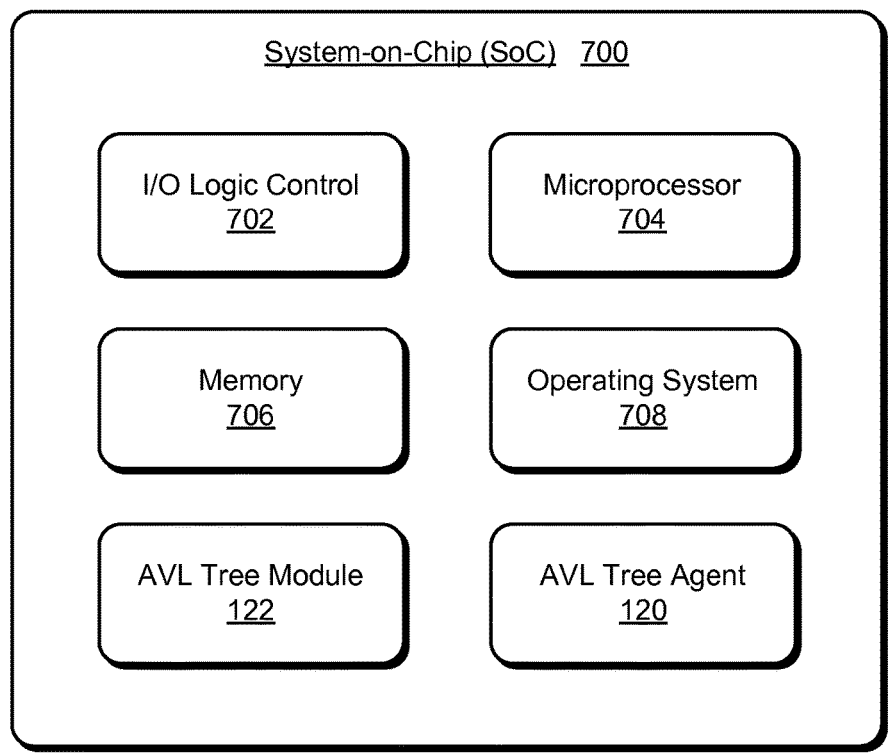
FIG. 7 illustrates a System-on-Chip (SoC) environment for implementing aspects of the techniques described herein.

FIG. 7 illustrates a System-on-Chip (SoC) 700, which can implement various aspects of a hardware-implemented AVL tree module as described above. A SoC can be implemented in any suitable device, such as a network access point, and/or any other type of electronic system configured to maintain information in a table that is to be searched.

SoC 700 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 700 can also include an integrated data bus or crossbar (not shown) that couples the various components of the SoC for data communication between the components. A wired or wireless communication device that includes SoC 700 can also be implemented with many combinations of differing components. In some cases, these differing components may be configured to implement concepts described herein over various types of wireless connections.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of RAM, low-latency nonvolatile memory (e.g., Flash memory), ROM, and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, communication components, other hardware, firmware, and/or software.

SoC 700 includes AVL tree module 122 and AVL tree agent 120 (embodied as disparate or combined components as noted above). Examples of these various components, functions, and/or entities, and their corresponding functionality, are described with reference to the respective components of the environment 100 shown in FIG. 1.

AVL tree agent 120, either independently or in combination with other entities, can be implemented as computer-executable instructions maintained by memory 706 and executed by microprocessor 704 to implement various embodiments and/or features described herein. AVL tree agent 120 may also be provided integral with other entities of the SoC, such as integrated with one or both of I/O logic controller 702 or any wireless interface within, or associated with, SoC 700. Alternatively or additionally, AVL tree agent 120 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   receiving, at an Adelson-Velskii and Landis' (AVL) tree module that is implemented in hardware, a command requesting that the AVL tree module perform an associated AVL tree operation for an AVL tree table stored in a memory, the command having been received at the AVL tree module from an agent via an interface of the AVL tree module, and the AVL tree table including records stored in the memory;
   writing the command to a first hardware thread of multiple prioritized hardware threads of the AVL tree module, wherein the multiple prioritized hardware threads have fixed priorities and at least one of the multiple prioritized hardware threads (i) has a different priority from another one of the multiple prioritized hardware threads and (ii) is configured to perform AVL tree operations that are associated with a respective priority of the hardware thread, in part, by:
   (i) causing one or more of the records stored in the memory as part of the AVL tree table to be read from the memory using a single read operation,
   (ii) causing one or more of the read records to be written to the AVL tree module to perform an AVL tree operation associated with the respective priority of the hardware thread,
   (iii) causing one or more of the written records to be modified without accessing the memory, and
   (iv) causing one or more of the modified records to be written back to the memory using a single write operation;
   employing the first hardware thread to which the command is written to perform the associated AVL tree operation, the first hardware thread employed based at least in part on being a highest priority thread having an input command written thereto; and
   subsequent to the first hardware thread performing the associated AVL tree operation, returning results of the associated AVL tree operation to the agent via the interface, wherein the results indicate to the agent whether the associated AVL tree operation was successfully performed by the AVL tree module.

2. The method of claim 1, wherein the multiple prioritized hardware threads of the AVL tree module are each associated with a different priority.

3. The method of claim 2, wherein the different priorities are enforced by the AVL tree module such that when commands have been written to the first hardware thread and a second hardware thread of the multiple prioritized hardware threads:
   the second hardware thread performs the AVL tree operations associated with the commands written to the second hardware thread based on the second hardware thread having a high priority relative to the first hardware thread; and
   the first hardware thread waits to perform the AVL tree operations associated with the commands written to the first hardware thread until the second hardware thread finishes performing the AVL tree operations associated with the commands written to the second hardware thread.

4. The method of claim 1, wherein commands that request the AVL tree module perform a search operation of the AVL tree table are written to a higher priority hardware thread than commands that involve the AVL tree module modifying one or more of the records of the AVL tree table.

5. The method of claim 1, wherein the interface of the AVL tree module comprises a shared bus that enables commands requesting that the AVL tree module perform an AVL tree operation be received from multiple agents at a same time.

6. The method of claim 1, wherein each of the multiple prioritized hardware threads of the AVL tree module is configured to store multiple commands in a respective input command first in first out (FIFO), and the commands that are stored in the respective input command FIFO corresponding to AVL tree operations that have yet to be performed by the hardware thread to which the input command FIFO corresponds.

7. The method of claim 1, further comprising halting a second AVL tree operation that is being performed at a second hardware thread of the multiple prioritized hardware threads responsive to the writing the command to the first hardware thread, the halting based on the first hardware thread being a higher priority than the second hardware thread.

8. The method of claim 1, further comprising permitting completion of a second AVL tree operation being performed at a hardware thread of a priority lower than the first hardware thread based on the second AVL tree operation causing one or more others of the records to be written back to the memory.

9. The method of claim 1, wherein the AVL tree operations that are associated with the respective priority of the hardware thread are associated based at least in part on a type of the AVL tree operation.

10. A device comprising:
    a memory configured to store an Adelson-Velskii and Landis' (AVL) tree table that is representative of an AVL tree, the AVL tree table including records stored in the memory;
    an AVL tree module implemented in hardware, wherein the AVL tree module (i) includes an interface to receive, from an AVL agent, commands requesting that the AVL tree module perform corresponding AVL tree operations for the AVL tree table, (ii) includes multiple prioritized hardware threads that are usable by the AVL tree module to perform the corresponding AVL tree operations associated with a priority of a respective hardware thread of the multiple hardware threads, and (iii) is configured to write one or more of the commands received via the interface to the respective hardware thread of the multiple prioritized hardware threads, and wherein at least one of the multiple prioritized hardware threads is configured to:
perform the AVL tree operations that correspond to the commands written to the hardware thread, in part, by:
(i) causing one or more of the records stored in the memory as part of the AVL tree table to be read from the memory using a single read operation,
(ii) causing one or more of the read records to be written to the AVL tree module to perform an AVL tree operation associated with the respective priority of the hardware thread,
(iii) causing one or more of the written records to be modified without accessing the memory, and
(iv) causing one or more of the modified records to be written back to the memory using a single write operation,
halt an AVL tree operation being performed when a command is written to another hardware thread of the multiple prioritized hardware threads, the other hardware thread having a higher priority than the hardware thread at which the AVL tree operation is being performed; and
subsequent to performing one of the AVL tree operations that corresponds to one of the commands written to the hardware thread, output results of the one of the AVL tree operations, the results indicating to the AVL agent whether the one of the AVL tree operations was successfully performed by the AVL tree module.

11. The device of claim 10, wherein the multiple prioritized hardware threads of the AVL tree module are each associated with a different priority.

12. The device of claim 11, wherein the AVL tree module is further configured, when commands have been written to more than one of the multiple prioritized hardware threads, to enforce the different priorities by:
causing a hardware thread with a highest priority, relative to other hardware threads of the multiple prioritized hardware threads, to perform the AVL tree operations requested by the commands written to the hardware thread with the highest priority; and
causing the other hardware threads to wait to perform AVL tree operations requested by commands written to the other hardware threads until the hardware thread with the highest priority finishes performing the AVL tree operations requested by the commands written to the hardware thread with the highest priority.

13. The device of claim 10, wherein commands that request the AVL tree module perform a search operation of the AVL tree table are written to a higher priority hardware thread than commands that involve the AVL tree module modifying one or more of the records.

14. The device of claim 10, wherein the AVL tree module is further configured to permit completion of another AVL tree operation being performed at another hardware thread of a priority lower than the hardware thread based on the AVL tree operation causing one or more others of the records to be written back to the memory.

15. The device of claim 10, wherein the one or more of the commands received via the interface are written to the respective hardware thread of the multiple prioritized hardware threads based at least in part on a type of the command.

16. One or more computer-readable memory devices embodying processor-executable instructions that, responsive to execution by a processor, implement operations to:
cause an Adelson-Velskii and Landis' (AVL) tree module, that is implemented in hardware, to receive a command requesting that the AVL tree module perform an AVL tree operation for an AVL tree table stored in a memory, the command having been received at the AVL tree module from an agent via an interface of the AVL tree module, and the AVL tree module including records stored in the memory;
cause the command to be written to a hardware thread of multiple prioritized hardware threads of the AVL tree module, wherein the hardware thread is configured to perform AVL tree operations that are associated with a respective priority of the hardware thread, in part, by:
(i) causing one or more of the records stored in the memory as part of the AVL tree table to be read from the memory using a single read operation,
(ii) causing one or more of the read records to be written to the AVL tree module to perform an AVL tree operation associated with the respective priority of the hardware thread,
(iii) causing one or more of the written records to be modified without accessing the memory, and
(iv) causing one or more of the modified records to be written back to the memory using a single write operation;
cause the hardware thread to begin performing the AVL tree operation requested by the command;
determine that a command is written to another hardware thread that has a higher priority than a priority of the hardware thread;
determine, based at least in part on a portion of the operation being performed, whether to complete the operation requested by the command or place the operation requested by the command on hold; and
subsequent to the first hardware thread performing the AVL tree operation, cause results of the AVL tree operation to be returned to the agent via the interface, the results indicating to the agent whether the AVL tree operation was successfully performed by the AVL tree module.

17. The one or more computer-readable memory devices of claim 16, wherein the multiple prioritized hardware threads of the AVL tree module are each associated with a different priority.

18. The one or more computer-readable memory devices of claim 17, wherein the different priorities are enforced such that when commands have been written to more than one of the multiple prioritized hardware threads the operations are further implemented to:
cause a hardware thread with a highest priority, relative to other hardware threads of the multiple prioritized hardware threads, to perform the AVL tree operations requested by the commands written to the hardware thread with the highest priority; and
cause the other hardware threads to wait to perform AVL tree operations requested by other commands written to the other hardware threads until the hardware thread with the highest priority finishes performing the AVL tree operations requested by the commands written to the hardware thread with the highest priority.

19. The one or more computer-readable memory devices of claim 16, wherein commands that request the AVL tree module perform a search operation of the AVL tree table are written to a higher priority hardware thread than commands that involve the AVL tree module modifying one or more of the records of the AVL tree table.

20. The one or more computer-readable memory devices of claim 16, wherein the hardware thread is of a priority lower than another hardware thread, and wherein the AVL tree operation that is being performed at the hardware thread is completed based on the AVL tree operation causing one or more others of the records to be written back to the memory.

* * * * *